E. F. KANDLBINDER.
JUICE EXTRACTOR.
APPLICATION FILED MAY 25, 1910.
992,667.
Patented May 16, 1911.
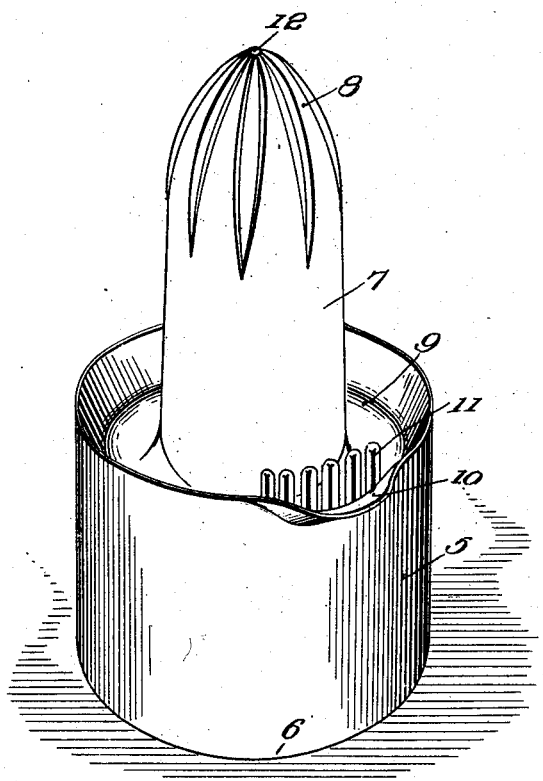
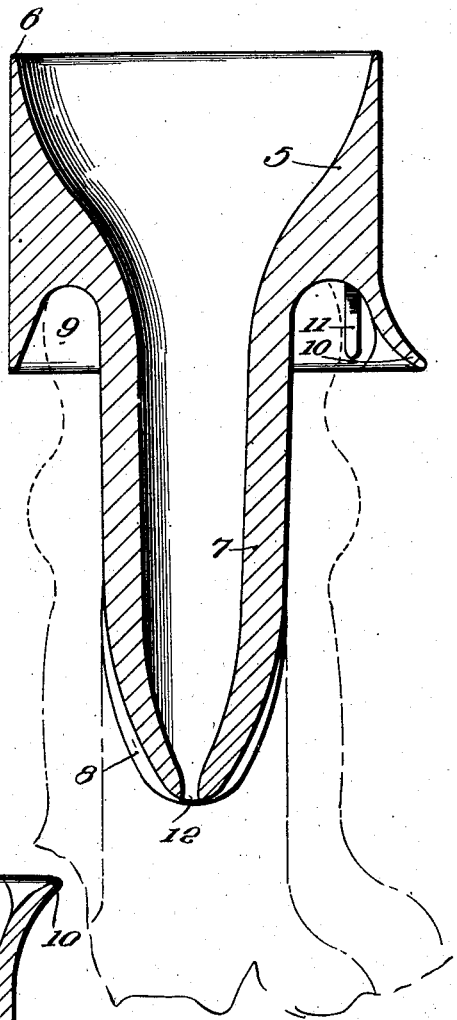
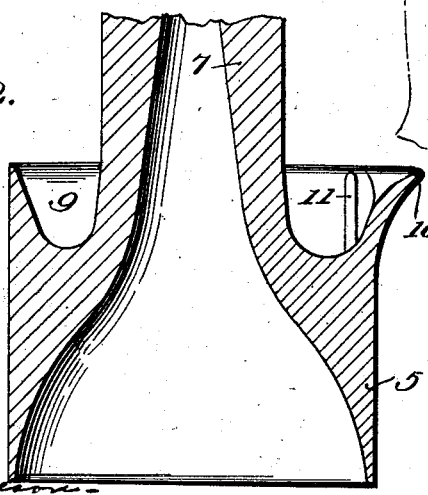
Witnesses
Inventor
E. F. Kandlbinder

UNITED STATES PATENT OFFICE.

EMELIA F. KANDLBINDER, OF SHREVEPORT, LOUISIANA.

JUICE-EXTRACTOR.

992,667.   Specification of Letters Patent.   Patented May 16, 1911.

Application filed May 25, 1910. Serial No. 563,453.

*To all whom it may concern:*

Be it known that I, EMELIA F. KANDLBINDER, citizen of the United States, residing at Shreveport, in the parish of Caddo and State of Louisiana, have invented certain new and useful Improvements in Juice-Extractors, of which the following is a specification.

This invention relates to lemon squeezers and has for its object the provision of a comparatively simple and thoroughly efficient device of this character, the construction of which is such that in addition to its function as a juice extractor, the device may be used as a biscuit cutter and funnel.

A further object of the invention is generally to improve this class of devices so as to increase their utility, durability and efficiency, as well as to reduce the cost of manufacture.

For a full understanding of the invention and the merits thereof, reference is to be had to the following description and accompanying drawings, in which:

Figure 1 is a perspective view of a lemon squeezer, constructed in accordance with my invention; Fig. 2 is a vertical sectional view of the lower portion of the device; Fig. 3 is a longitudinal sectional view, showing the device inverted.

Corresponding and like parts are referred to in the following description and indicated in all the views of the drawings by the same reference characters.

The device comprises a hollow body portion 5 preferably cylindrical in shape, as shown, and having its interior wall at the lower end thereof inclined or beveled to form a cutting edge 6 which may be used for cutting biscuits.

Projecting from the top of the body portion 5 and preferably formed integral therewith, is a cylindrical extension 7 the free end of which is tapered and provided with a plurality of longitudinally disposed ribs 8 which serve to macerate a lemon when positioned thereon and rotated, thus to extract the juice therefrom. The walls of the body portion 5 are extended above the base of the extracting cone 7 to form an annular trough 9 adapted to receive the juice extracted by the cone 7, one wall of the trough 9 being extended laterally to produce a discharge spout 10. A series of teeth 11 project vertically from the bottom of the trough 9 at the spout 10 thereof in order to prevent the seeds from escaping from the trough when pouring the juice into a cup or other receptacle designed to receive the same. The extractor 7 is also hollow and is provided at the intersection of the ribs 8 with an opening 12 so that by inverting the device and inserting the extension 7 in the mouth of a jar, bottle or other receptacle, the device may be used as a funnel. It will here be noted that the extension 7 not only forms a juice extractor, but being devoid of surface projections between the base of said extension and the tapered end thereof, presents a smooth bearing surface to the hand when the device is used as a biscuit cutter. It will also be noted that when the device is inverted and inserted in a bottle or jar, the bottom of the trough 9 forms a support for the body portion 5 and serves to limit the downward movement of said body portion.

When the device is used as a juice extractor, one-half of a lemon is positioned on the free end of the extension 7 and rotated, thus causing the ribs 8 to macerate the lemon and extract the juice therefrom, which latter flows into the trough 9 and from which it may be removed by tilting the body portion and allowing the juice to flow through the spout 10 into a suitable receptacle, the teeth 11 serving to retain the seeds within the trough, as before stated.

The device may be made in different sizes and shapes and formed of glass, porcelain, terra-cotta, metal or other suitable material.

While I have shown the teeth formed integral with the body portion, it will of course be understood that these teeth may be made separate and inserted in suitable recesses designed to receive the same, and that in some cases, the teeth may be entirely dispensed with, without departing from the spirit of the invention.

Having thus described the invention, what is claimed as new is:

1. A device of the class described including a hollow reversible body portion having one end thereof reduced to form a hollow extension, the free end of which is tapered and provided with exterior macerating ribs and a central opening communicating with the interior of said body portion, the exterior walls of the extension between the base and the tapered end thereof being imperforate and devoid of surface projections.

2. A device of the class described comprising a hollow body portion having one end thereof reduced to form a hollow cylindrical extension, the free end of which is tapered and provided with an opening communicating with the interior of said body portion, the top of said body portion being extended above the base of the cylindrical extension to form an annular liquid receiving trough, and the side walls of the extension between the trough and tapered end thereof being parallel and devoid of surface projections.

3. A device of the class described comprising a hollow reversible body portion having one end thereof reduced to form a hollow cylindrical extension, the free end of which is tapered and provided with intersecting longitudinal macerating ribs, there being an opening formed in the tapered end of the extension and communicating with the interior of the body portion, a liquid receiving trough surrounding the base of the extension and provided with a discharge spout, a strainer disposed within said discharge spout, the exterior walls of the extension between the trough and the tapered end thereof being parallel and devoid of surface projections, and the interior walls of the extension being smooth and unobstructed.

In testimony whereof, I affix my signature in presence of two witnesses.

EMELIA F. KANDLBINDER. [L. S.]

Witnesses:
S. O. WILLIAMS,
A. T. HAYNES.

---

Copies of this patent may be obtained for five cents each, by addressing the "Commissioner of Patents, Washington, D. C."